US012634618B2

(12) United States Patent
Yang

(10) Patent No.: US 12,634,618 B2
(45) Date of Patent: May 19, 2026

(54) SOUND PROVIDING METHOD USING EARPHONE SET AND EARPHONE SET

(71) Applicant: Bill Yang, Taipei City (TW)

(72) Inventor: Bill Yang, Taipei City (TW)

(73) Assignee: Cotron Corporation, Taipei City (TW)

( * ) Notice: Subject to any disclaimer, the term of this patent is extended or adjusted under 35 U.S.C. 154(b) by 191 days.

(21) Appl. No.: 18/395,612

(22) Filed: Dec. 24, 2023

(65) Prior Publication Data

US 2024/0267670 A1 Aug. 8, 2024

(30) Foreign Application Priority Data

Feb. 6, 2023 (TW) ................................ 112104096
May 29, 2023 (TW) ................................ 112119983
Sep. 1, 2023 (TW) ................................ 112133194

(51) Int. Cl.
*H04R 1/22* (2006.01)
*H04R 1/10* (2026.01)

(52) U.S. Cl.
CPC .......... *H04R 1/225* (2013.01); *H04R 1/1016* (2013.01); *H04R 1/1041* (2013.01); *H04R 2420/07* (2013.01)

(58) Field of Classification Search
CPC .... H04R 1/225; H04R 1/1016; H04R 1/1041; H04R 2420/07
See application file for complete search history.

(56) References Cited

U.S. PATENT DOCUMENTS

| | | | |
|---|---|---|---|
| 5,135,468 A | 8/1992 | Meissner | |
| 9,288,588 B2 | 3/2016 | Mesfin | |
| 10,264,357 B1 | 4/2019 | Su | |
| 12,363,481 B2 * | 7/2025 | Pan | H04S 7/304 |
| 2006/0116597 A1 | 6/2006 | Vesely et al. | |
| 2006/0252978 A1 | 11/2006 | Vesely et al. | |
| 2007/0282216 A1 | 12/2007 | Vesely et al. | |
| 2008/0304691 A1 | 12/2008 | Lai | |
| 2010/0239096 A1 | 9/2010 | Jeon et al. | |
| 2013/0010967 A1 | 1/2013 | Atwater et al. | |

(Continued)

FOREIGN PATENT DOCUMENTS

| | | |
|---|---|---|
| CN | 200983674 | 11/2007 |
| CN | 202364375 | 8/2012 |

(Continued)

OTHER PUBLICATIONS

"Office Action of Japan Counterpart Application", issued on Mar. 5, 2025, p. 1-p. 7.

(Continued)

*Primary Examiner* — Andrew Sniezek
(74) *Attorney, Agent, or Firm* — JCIPRNET

(57) ABSTRACT

A sound providing method using an earphone set and an earphone set are provided. The sound providing method using the earphone set includes simultaneously providing a first sound wave to a left ear of a user by using a left ear earphone of an earphone set and a second sound wave to a right ear of the user by using a right ear earphone of the earphone set. There is a frequency difference between a first frequency of the first sound wave and a second frequency of the second sound wave. The frequency difference automatically and cyclically changes along with time.

28 Claims, 16 Drawing Sheets

(56) References Cited

U.S. PATENT DOCUMENTS

| | | | |
|---|---|---|---|
| 2013/0202119 | A1 | 8/2013 | Thiede |
| 2014/0350706 | A1 | 11/2014 | Morishima |
| 2015/0071448 | A1 | 3/2015 | Mesfin |
| 2016/0030702 | A1 | 2/2016 | Yang |
| 2016/0110349 | A1 | 4/2016 | Norman-Rosedam |
| 2017/0173296 | A1 | 6/2017 | Park et al. |
| 2019/0282779 | A1 | 9/2019 | Holloway |
| 2019/0328996 | A1 | 10/2019 | Lee et al. |
| 2020/0382884 | A1 | 12/2020 | Chang et al. |
| 2021/0021947 | A1 | 1/2021 | Kao et al. |
| 2021/0030998 | A1 | 2/2021 | Wong |
| 2021/0152920 | A1 | 5/2021 | Gong et al. |
| 2021/0218380 | A1 | 7/2021 | Chao et al. |
| 2021/0338970 | A1 | 11/2021 | Radtke |
| 2021/0377642 | A1 | 12/2021 | Luo et al. |
| 2022/0088343 | A1 | 3/2022 | Kao et al. |
| 2022/0176151 | A1 | 6/2022 | Brown et al. |
| 2023/0001127 | A1 | 1/2023 | Khalil |

FOREIGN PATENT DOCUMENTS

| | | |
|---|---|---|
| CN | 103493512 | 1/2014 |
| CN | 103691044 | 4/2014 |
| CN | 103796702 | 5/2014 |
| CN | 206370925 | 8/2017 |
| CN | 109621153 | 4/2019 |
| CN | 109756880 | 5/2019 |
| CN | 110246508 | 9/2019 |
| CN | 111821556 | 10/2020 |
| CN | 113223541 | 8/2021 |
| CN | 217307842 | 8/2022 |
| EP | 2362678 | 8/2011 |
| EP | 2777165 | 4/2018 |
| EP | 3248577 | 9/2021 |
| IN | 201641029383 | 3/2018 |
| JP | H0833714 | 2/1996 |
| JP | H08196638 | 8/1996 |
| JP | 2000197171 | 7/2000 |
| JP | 2001014314 | 1/2001 |
| JP | 2005279286 | 10/2005 |
| JP | 2005334163 | 12/2005 |
| JP | 3142675 | 6/2008 |
| JP | 2011259409 | 12/2011 |
| JP | 2014507889 | 3/2014 |
| JP | 2015506142 | 2/2015 |
| JP | 2017111414 | 6/2017 |
| JP | 2017121529 | 7/2017 |
| JP | 2020110582 | 7/2020 |
| JP | 3236581 | 3/2022 |
| JP | 2022529033 | 6/2022 |
| KR | 20070112581 | 11/2007 |
| KR | 20090041667 | 4/2009 |
| KR | 20160117882 | 10/2016 |
| KR | 101828952 | 2/2018 |
| TW | 201640918 | 11/2016 |
| TW | 202127906 | 7/2021 |
| WO | 0237449 | 5/2002 |
| WO | 2014160757 | 10/2014 |
| WO | 2018030404 | 2/2018 |
| WO | 2018159519 | 9/2018 |
| WO | 2019045857 | 3/2019 |
| WO | 2021192072 | 9/2021 |
| WO | 2022141552 | 7/2022 |

OTHER PUBLICATIONS

"Office Action of Taiwan Counterpart Application", issued on Mar. 5, 2025, p. 1-p. 10.
"Office Action of Russia Counterpart Application", issued on Aug. 28, 2024, p. 1-p. 12.
"Search Report of Europe Counterpart Application", issued on Mar. 1, 2024, p. 1-p. 9.
F. R. On et al., "Binaural Beat Effect on Brainwaves based on EEG", 2013 IEEE 9th International Colloquium on Signal Processing and its Applications, Mar. 8-10, 2013, pp. 339-343.
"Office Action of Great Britain Counterpart Application", issued on Jul. 16, 2024, p. 1-p. 7.
"Notice of allowance of Japan Counterpart Application", issued on Jun. 25, 2025, p. 1-p. 3.
"Office Action of Russia Counterpart Application", issued on Jul. 1, 2025, p. 1-p. 12.
"Office Action of Korea Counterpart Application", issued on Aug. 24, 2025, p. 1-p. 8.
"Office Action of Russia Counterpart Application", issued on Apr. 17, 2025, p. 1-p. 9.

* cited by examiner

SOUND PROVIDING METHOD USING EARPHONE SET AND EARPHONE SET

CROSS-REFERENCE TO RELATED APPLICATION

This application claims the priority benefit of Taiwan application serial no. 112104096, filed on Feb. 6, 2023, the priority benefit of Taiwan application serial no. 112119983, filed on May 29, 2023, and the priority benefit of Taiwan application serial no. 112133194, filed on Sep. 1, 2023. The entirety of each of the above-mentioned patent applications is hereby incorporated by reference herein and made a part of this specification.

BACKGROUND

Technical Field

The disclosure relates to a method and a device, and in particular to a sound providing method using an earphone set and an earphone set.

Description of Related Art

With the rapid advancement of technology, there are more and more opportunities to use headphones to communicate with people or receive messages. However, there is a problem to be overcome, how to make the participants focus on communication without face-to-face situation to enhance the efficiency.

SUMMARY

The disclosure provides a sound providing method using an earphone set, allowing users to feel binaural beats.

The sound providing method using the earphone set of the disclosure includes simultaneously providing a first sound wave to a left ear of a user by using a left ear earphone of an earphone set and a second sound wave to a right ear of the user by using a right ear earphone of the earphone set. There is a frequency difference between a first frequency of the first sound wave and a second frequency of the second sound wave. The frequency difference automatically and cyclically changes along with time.

In one embodiment of the disclosure, the frequency difference is changed multi-segmentally along with time.

In one embodiment of the disclosure, the frequency difference is remained unchanged for 5 seconds to 120 seconds after each change.

In one embodiment of the disclosure, the frequency difference is changed automatically and cyclically between 0.5 Hz and 4 Hz, automatically and cyclically between 4 Hz and 8 Hz, automatically and cyclically between 8 Hz and 12 Hz, automatically and cyclically between 12 Hz and 20 Hz, or automatically and cyclically between 25 Hz and 40 Hz.

In one embodiment of the disclosure, after respectively providing the first sound wave and the second sound wave to the left ear and the right ear of the user for a predetermined time, provision of the first sound wave and the second sound wave is automatically stopped.

In one embodiment of the disclosure, the first sound wave and the second sound wave are respectively generated after performing a frequency adjustment on a self-selected audio of the user by a frequency adjuster of the earphone set.

In one embodiment of the disclosure, the sound providing method using the earphone set further includes providing a first background sound wave to the left ear of the user by using the left ear earphone and a second background sound wave to the right ear of the user by using the right ear earphone while providing the first sound wave and the second sound wave. The frequency difference is provided between a third frequency of the first background sound wave and a fourth frequency of the second background sound wave.

An earphone set of the disclosure includes a left ear earphone, a right ear earphone, a first wireless communicator, and a frequency adjuster. The left ear earphone is configured to provide a first sound wave to a left ear of a user. The right ear earphone is configured to provide a second sound wave to a right ear of the user. The frequency adjuster is electrically connected to the left ear earphone, the right ear earphone, and the first wireless communicator. The first wireless communicator is configured to receive and transmit an external audio to the frequency adjuster. The frequency adjuster adjusts the external audio to a first audio and transmits to the left ear earphone so that the first sound wave is emitted. The frequency adjuster adjusts the external audio to a second audio and transmits to the right ear earphone so that the second sound wave is emitted. There is a frequency difference between a first frequency of the first sound wave and a second frequency of the second sound wave. The frequency difference automatically and cyclically changes along with time.

In one embodiment of the aforementioned earphone set of the disclosure, the earphone set further includes a second wireless communicator and a wireless communication switch. The second wireless communicator is configured to receive the external audio. The wireless communication switch is configured to switch between the left ear earphone and the right ear earphone to connect to the first wireless communicator or the second wireless communicator by signal.

Another earphone set of the disclosure includes a left ear earphone, a right ear earphone, a first wireless communicator, a frequency adjuster, a second wireless communicator, and a wireless communication switch. The left ear earphone is configured to provide a first sound wave to a left ear of a user. The right ear earphone is configured to provide a second sound wave to a right ear of the user. The frequency adjuster is electrically connected to the left ear earphone, the right ear earphone, and the first wireless communicator. The first wireless communicator is configured to receive and transmit an external audio to the frequency adjuster. The frequency adjuster adjusts the external audio to a first audio and transmits to the left ear earphone so that the first sound wave is emitted. The frequency adjuster adjusts the external audio to a second audio and transmits to the right ear earphone so that the second sound wave is emitted. There is a frequency difference between a first frequency of the first sound wave and a second frequency of the second sound wave. The frequency difference automatically changes along with time. The second wireless communicator is configured to receive the external audio. The wireless communication switch is configured to switch between the left ear earphone and the right ear earphone to connect to the first wireless communicator or the second wireless communicator by signal.

In one embodiment of the aforementioned two kinds of earphone sets of the disclosure, the first wireless communicator performs wireless communication with a cell phone, and the cell phone transmits the external audio.

In one embodiment of the aforementioned two kinds of earphone sets of the disclosure, the first wireless communicator performs wireless communication with a cell phone, and the cell phone executes a voice communication application.

In one embodiment of the aforementioned two kinds of earphone sets of the disclosure, the earphone set further includes a pick-up and a pick-up switch. The pick-up is electrically connected to the first wireless communicator and is configured to transmit a third audio obtained by pickup to the first wireless communicator. The first wireless communicator transmits the third audio to an outside. The pick-up switch is electrically connected to the pick-up and configured to enable or disable the pick-up.

In one embodiment of the aforementioned two kinds of earphone sets of the disclosure, the earphone set further includes a language conversion circuit, configured to receive and identify a first language included in the third audio, convert the first language to a second language, and transmit a fourth audio including the second language to the left ear earphone and the right ear earphone.

In one embodiment of the aforementioned two kinds of earphone sets of the disclosure, the first wireless communicator serves as a node of a many-to-many Bluetooth mesh or performs Bluetooth broadcast.

In one embodiment of the aforementioned two kinds of earphone sets of the disclosure, the second wireless communicator performs frequency modulation communication, and the first wireless communicator performs Bluetooth communication.

In one embodiment of the aforementioned two kinds of earphone sets of the disclosure, the second wireless communicator includes a receiver, multiple antennas, and a frequency band switcher. The antennas are configured to receive signals of different frequency bands. The frequency band switcher is configured to control the receiver to electrically connect to one of the antennas.

In one embodiment of the aforementioned two kinds of earphone sets of the disclosure, the first wireless communicator performs wireless communication with a cell phone. The cell phone executes a differential frequency control application to control the frequency difference through the frequency adjuster.

In one embodiment of the aforementioned two kinds of earphone sets of the disclosure, the differential frequency control application further controls a frequency difference of multiple slave earphone sets.

In one embodiment of the aforementioned two kinds of earphone sets of the disclosure, the earphone set further includes an audio source, configured to transmit an internal audio to the frequency adjuster. The frequency adjuster adjusts the internal audio to a third audio and transmits to the left ear earphone so that a third sound wave is emitted. The frequency adjuster adjusts the internal audio to a fourth audio and transmits to the right ear earphone so that a fourth sound wave is emitted. There is a frequency difference between a third frequency of the third sound wave and a fourth frequency of the fourth sound wave.

Based on the above, in the sound providing method using the earphone set and the earphone set of the disclosure, the frequency difference automatically changes along with time, allowing the user to receive the changing binaural difference frequency and obtain the corresponding effect.

DESCRIPTION OF THE EMBODIMENTS

One embodiment of the disclosure provides a sound providing method using an earphone set. In this method, a first sound wave is provided to a left ear of a user by using a left ear earphone of an earphone set and a second sound wave is provided to a right ear of the user by using a right ear earphone of the earphone set simultaneously. The earphone set used here may be any earphone set introduced in the subsequent embodiment or other earphone sets that may perform this method. A frequency of the first sound wave is a first frequency, and a frequency of the second sound wave is a second frequency. There is a frequency difference between the first frequency and the second frequency. This frequency difference automatically and cyclically changes along with time. Namely, the frequency difference is not constant. Moreover, without human intervention, this frequency difference is automatically changed according to a preset method. In addition, the way this frequency difference changes is preset and is unable to be adjusted or selected by the user. Alternatively, there may be multiple ways to change and the user may choose which one to use. In addition, the user's physiological state is not detected before determining how the frequency difference changes, that is, the frequency difference does not change according to the difference in the user's physiological state.

Brain waves refer to electrical swing generated when nerve cells in a human brain are active, which may also be referred to as a rhythm of brain cell activity. The human brain always produces brain waves. Classified by frequency, brain waves include at least β wave, α wave, θ wave, δ wave, and γ wave. Generally, when a person is in a third stage of a non-rapid eye movement sleep, the brain wave is usually a δ wave (with a frequency between 0.5 Hz and 4 Hz). When a person is in a deep sleep dreaming, deep meditation, a state of intense subjectivity, etc., the brain wave is usually a θ wave (with a frequency between 4 Hz and 8 Hz). When a person is in a state of dazed mind before going to sleep, gradually blurred consciousness, flashes of inspiration, relaxed body and focused mind, etc., the brain wave is usually an α wave. When a person is in a relaxed but focused state, a state of sorting out previously received information, etc., the brain wave is usually a β wave. However, studies have also found that when the human brain is induced to produce different brain waves, it also affects the state of the person in turn. For example, when the human brain is induced to produce the α wave, the person is also brought into a state of flashes of inspiration, relaxed body and focused mind, etc.

Figure 1A:
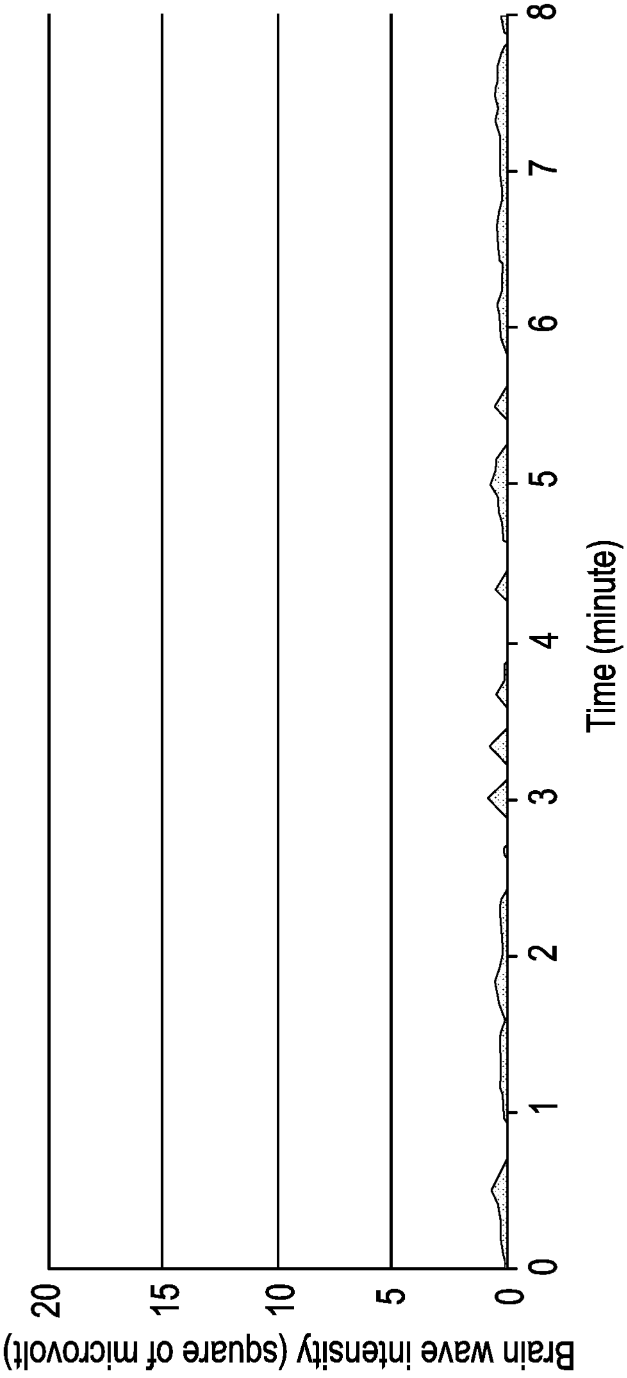
FIG. 1A is an experimental result of a comparative example 1 using a sound providing method using an earphone set of the prior art.

Based on the above reasons, the prior art attempts to respectively provide two kinds of sound waves with different frequencies to a left ear and a right ear of the user, and make a frequency difference of the two sound waves to correspond to a frequency of the brain wave desired to be induced. However, the prior art keeps the frequency difference between the two sound waves at a constant value. FIG. 1A is an experimental result of a comparative example 1 using a sound providing method using an earphone set of the prior art. In the comparative example 1, the frequency difference is kept constant at 8 Hz. Referring to FIG. 1A, within 8 minutes of continuously inputting such frequency difference, almost no α wave is induced in a brain of a testee.

Figure 1B:
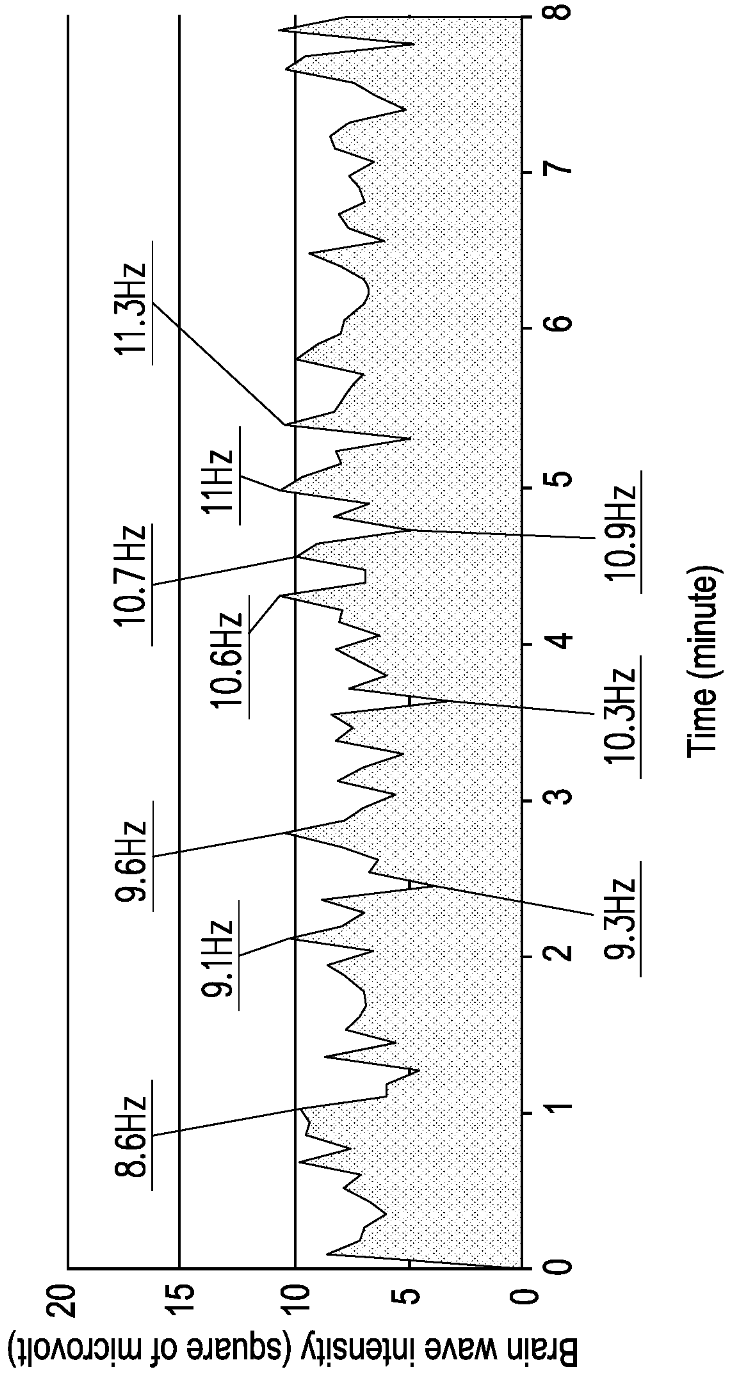
FIG. 1B is an experimental result of an experimental example 1 using a sound providing method using an earphone set of the embodiment.

Conversely, in the sound providing method using the earphone set of the embodiment, the frequency difference between the first frequency and the second frequency is changed automatically and cyclically along with time. FIG. 1B is an experimental result of an experimental example 1 using a sound providing method using an earphone set of the embodiment. The testees in the comparative example 1 and experimental example 1 are the same person. In the experimental example 1, the frequency difference is segmentally changed between 8 Hz and 12 Hz automatically and cyclically, a change amount of each change in the frequency difference is 0.1 Hz, and the same frequency difference is remained unchanged for 10 seconds after each change. The automatic and segmented automatic cyclic change of the frequency difference between 8 Hz and 12 Hz means, for example, a gradual change from 8 Hz to 12 Hz, and then a gradual change from 12 Hz to 8 Hz, for example, a repetitive gradual change from 8 Hz to 12 Hz, or for example, a repetitive gradual change from 12 Hz to 8 Hz. Referring to FIG. 1B, within 8 minutes of continuously inputting the frequency difference in the manner of the experimental example 1, it may be detected that the brain of the testee is induced with α waves in almost most of the time periods, especially when the frequency difference is at 8.6 Hz, 9.1 Hz, 9.6 Hz, 10.6 Hz, 10.7 Hz, 11 Hz and 11.3 Hz, the energy of the induced α waves are particularly high.

Comparing the experimental result of the comparative example 1 in FIG. 1A and the experimental result of the experimental example 1 in FIG. 1B, it may be clearly seen that the sound providing method using the earphone set of the embodiment is more efficient in inducing brain waves than the prior art. Namely, in the sound providing method using the earphone set of the embodiment, the automatic and cyclic change of the frequency difference along with time may obviously and effectively induce brain waves.

In order to provide two kinds of sound waves of different frequencies to the left ear and the right ear of the user, an earphone set may be used, such as an earmuff earphone set, an earplug earphone set, an in-ear earphone set or other different types of earphone sets, and the earphone set may be, for example, a wired earphone set, a Bluetooth earphone set, or other wireless earphone sets. The earphone set may further have an active noise cancellation (ANC) function to avoid being affected by ambient noise.

In various embodiments of the disclosure, the user may select an audio, such as a pop song, a classical music, a radio program or any other type of audio. After receiving the self-selected audio, for example, a sound wave of the self-selected audio to be provided to the left ear is up-converted to generate a first sound wave, and a sound wave of the self-selected audio to be provided to the right ear is down-converted to generate a second sound wave, so that there is a desired frequency difference between a first frequency of the first sound wave and a second frequency of the second sound wave, and the first sound wave and the second sound wave are respectively provided to the left ear and the right ear of the user. Alternatively, the sound wave of the self-selected audio to be provided to the left ear may be down-converted to generate the first sound wave, and the sound wave of the self-selected audio to be provided to the right ear is up-converted to generate the second sound wave, so that there is the desired frequency difference between the first frequency of the first sound wave and the second frequency of the second sound wave. Alternatively, the sound wave of the self-selected audio to be provided to the left ear may be up-converted to generate the first sound wave, and the sound wave of the self-selected audio to be provided to the right ear is directly taken as the second sound wave, so that there is the desired frequency difference between the first frequency of the first sound wave and the second frequency of the second sound wave. Alternatively, the sound wave of the self-selected audio to be provided to the left ear is directly taken as the first sound wave, and the sound wave of the self-selected audio to be provided to the right ear may be down-converted to generate the second sound wave, so that there is the desired frequency difference between the first frequency of the first sound wave and the second frequency of the second sound wave. No matter what method is adopted, the spirit of the disclosure is met as long as there is the desired frequency difference between the first frequency of the first sound wave and the second frequency of the second sound wave.

In addition, since the user-self-selected audio may have blank parts. In order to continue to induce brain waves in the blank parts, a first background sound wave may be provided to the left ear of the user and a second background sound wave may be provided to the right ear of the user while providing the first sound wave and the second sound wave. A third frequency of the first background sound wave and a fourth frequency of the second background sound wave have a desired frequency difference. Since the background sound wave is continuous and has no blank part, it may continue to induce brain waves in the blank parts of the user's self-selected audio. The background sound waves are, for example, sound waves that are not likely to affect the self-selected audio such as a wind blowing sound, an ocean wave sound, etc.

Figure 2A:
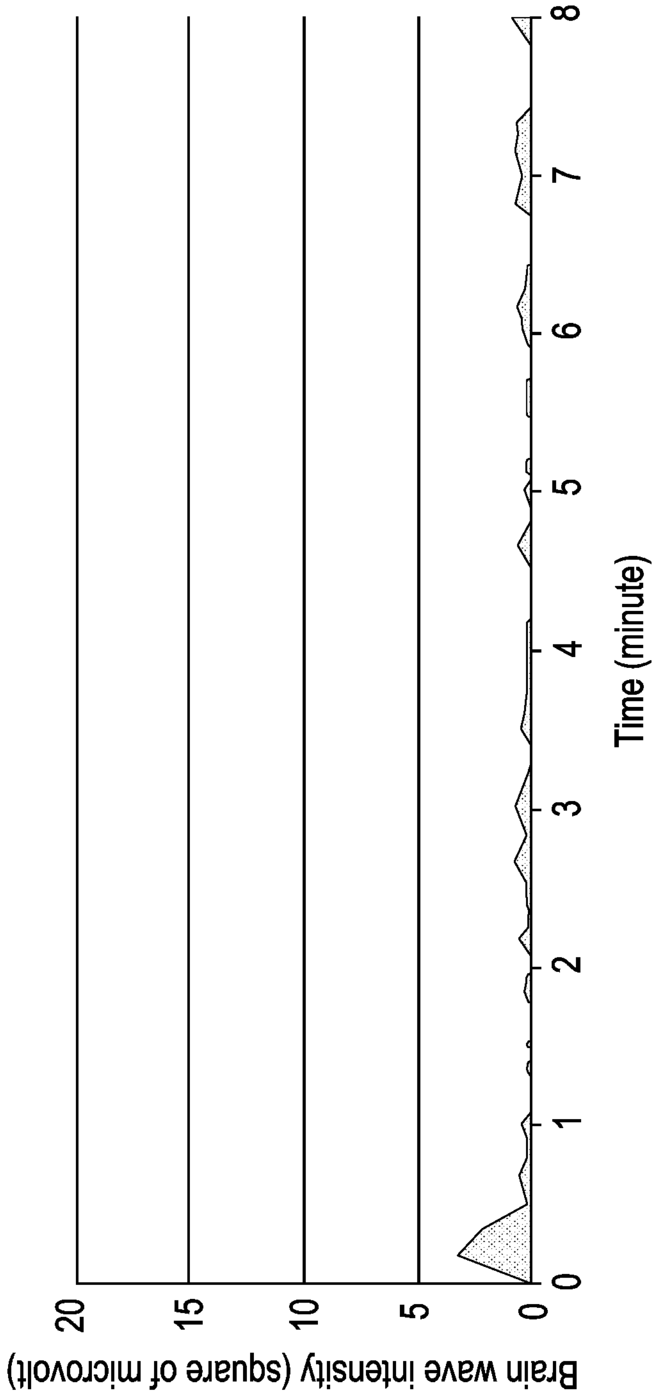
FIG. 2A is an experimental result of a comparative example 2 using a sound providing method using an earphone set of the prior art.

FIG. 2A is an experimental result of a comparative example 2 using a sound providing method using an earphone set of the prior art. In the comparative example 2, the frequency difference was kept constant at 8 Hz, but the testee is different from that of the comparative example 1. Referring to FIG. 2A, within 8 minutes of continuously inputting the frequency difference, the α wave is only induced in the brain of the testee at the beginning, but a duration thereof is less than 30 seconds.

Figure 2B:
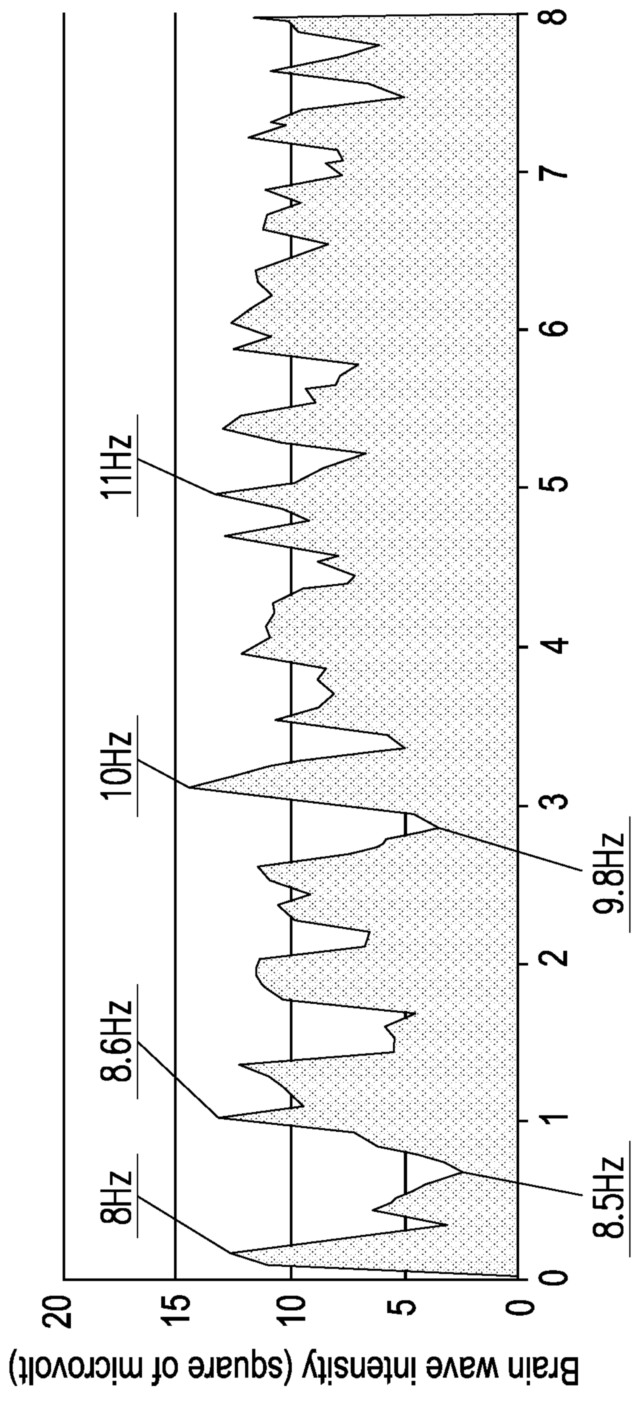
FIG. 2B is an experimental result of an experimental example 2 using a sound providing method using an earphone set of the embodiment.

FIG. 2B is an experimental result of an experimental example 2 using a sound providing method using an earphone set of the embodiment. The testees in the comparative example 2 and experimental example 2 are the same person. In the experimental example 2, the frequency difference is segmentally changed between 8 Hz and 12 Hz automatically and cyclically, a change amount of each change in the frequency difference is 0.1 Hz, and the same frequency difference is remained unchanged for 10 seconds after each change. Referring to FIG. 2B, within 8 minutes of continuously inputting the frequency difference in the manner of the experimental example 2, it may be detected that the brain of the testee is induced with α waves in almost most of the time periods, especially when the frequency difference is at 8 Hz, 8.6 Hz, 10 Hz and 11 Hz, the energy of the induced α waves are particularly high.

automatic and cyclic change of the frequency difference, the method of the disclosure may basically have a good induction effect on the user's brain during the changing period.

In addition, each user's brain may not only have a good induction effect for a single frequency difference, but usually may have good induction effect for multiple frequency differences. Since the sound providing method using the earphone set of the embodiment induces the user's brain waves with automatically and cyclically changing frequency differences, better induction effects may be produced at multiple frequency differences. Moreover, it may also be seen from the comparative example 2 in FIG. 2A that even if the testee has a good induction effect for the input single frequency difference, the duration thereof may not be long. Since the sound providing method using the earphone set of the embodiment induces the brain waves of the user with the automatically and cyclically changing frequency difference and may automatically and cyclically change within a selected range, another frequency difference may be switched to produce the good induction effect again after the user's brain is tired. Finally, the sound providing method using the earphone set of the embodiment may produce good brain wave induction effects in a longer period of time.

In the embodiment, the frequency difference is changed multi-segmentally along with time, i.e., there is a relatively obvious difference between the frequency difference at a previous moment and the frequency difference at a next moment. A change amount of each change in the frequency difference may be between 0.1 Hz and 1 Hz, such as 0.1 Hz, 0.2 Hz, 0.5 Hz, or 1 Hz. In other embodiments, the frequency difference may also change non-segmentally along with time.

TABLE 1

| | | Time of inducing brain wave | | | | |
|---|---|---|---|---|---|---|
| | | 5~30 seconds | 30~60 seconds | 60~90 seconds | 90~120 seconds | No induction |
| Frequency of inducing brain wave | 2 Hz | 12 people | 7 people | 2 people | 2 people | 2 people |
| | 6 Hz | 10 people | 8 people | 1 people | 3 people | 3 people |
| | 10 Hz | 11 people | 7 people | 3 people | 2 people | 2 people |
| | 20 Hz | 9 people | 8 people | 4 people | 1 people | 3 people |

Comparing the experimental result of the comparative example 2 in FIG. 2A and the experimental result of the experimental example 2 in FIG. 2B, it may be proved again that the sound providing method using the earphone set of the embodiment is more efficient in inducing brain waves than the prior art. Namely, in the sound providing method using the earphone set of the embodiment, the automatic and cyclic change of the frequency difference along with time may obviously and effectively induce brain waves.

In addition, with reference to the experimental result of the experimental example 1 of FIG. 1B and the experimental result of the experimental example 2 of FIG. 2B, it may also be found that the first sound wave and the second sound wave of different frequency differences have different effects on brain wave induction of different testees. Therefore, in the prior art, the constant frequency difference is used to induce the brain waves of different users, which may not have a good induction effect. Conversely, the sound providing method using the earphone set of the embodiment induces the brain waves of the user with an automatically and cyclically changing frequency difference, even if the brain wave of a certain user does not have a good induction effect at a specific frequency difference, along with the Referring to the table 1 above, when 25 testees are tested for brain wave induction with sound waves of a constant frequency difference, 9-12 people are detected to induce brain waves of 2 Hz, 6 Hz, 10 Hz and/or 20 Hz between 5 and 30 seconds, 7-8 people are detected to induce brain waves between 30 and 60 seconds, 1-4 people are detected to induce brain waves between 60 and 90 seconds, and 1-3 people are detected to induce brain waves between 90 and 120 seconds. However, in the first 5 seconds of the test, no one is detected to induce brain waves of 2 Hz, 6 Hz, 10 Hz or 20 Hz, and after testing for more than 120 seconds, there are still 2-3 people who have not been detected to induce brain waves of 2 Hz, 6 Hz, 10 Hz or 20 Hz. Namely, if the test lasts for less than 5 seconds, basically the purpose of inducing brain waves cannot be achieved. On the other hand, if the testee still has no brain waves induced after the test is maintained for 120 seconds, the purpose of inducing brain waves cannot be achieved by continuing the test.

In each embodiment of the disclosure, after inducing the brain waves of the user with a sound wave of a constant frequency difference for a predetermined time, the provision of the first sound wave and the second sound wave may be automatically stopped, but the disclosure is not limited thereto.

Figure 3A:
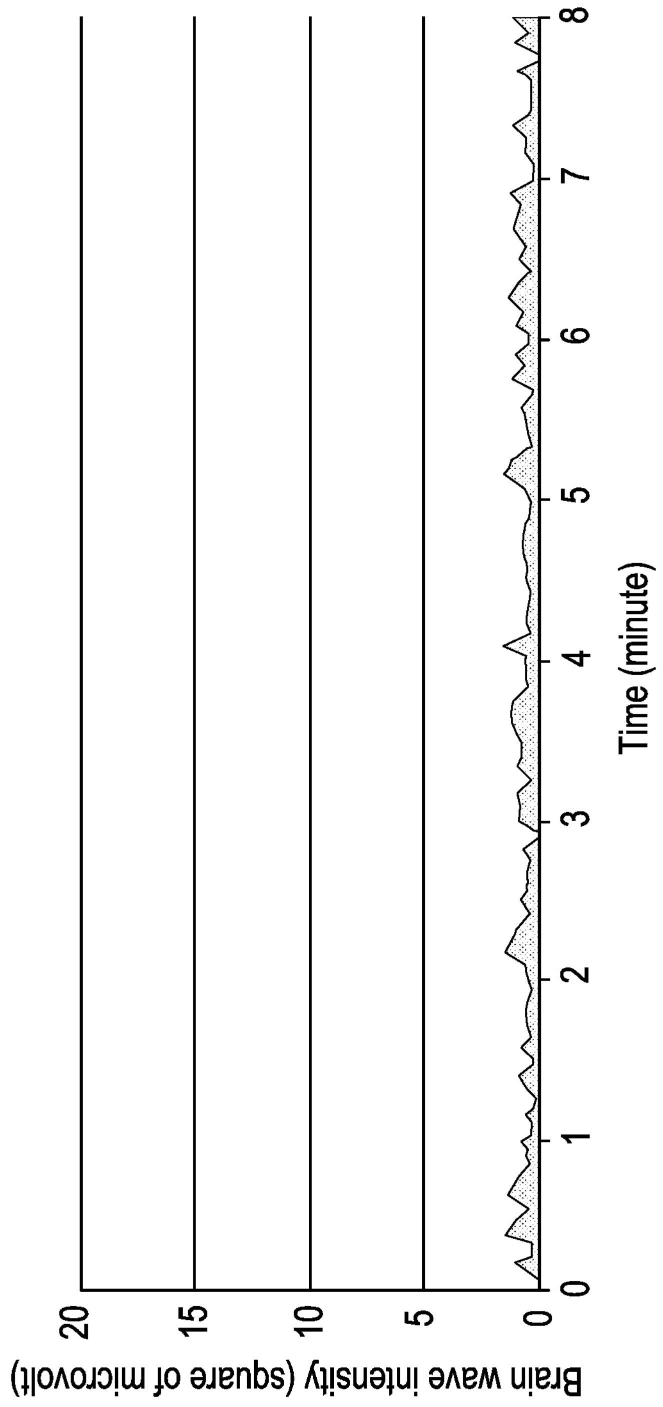
FIG. 3A is an experimental result of an experimental example 3 using a sound providing method using an earphone set of the embodiment.

FIG. 3A is an experimental result of an experimental example 3 using a sound providing method using an earphone set of the embodiment. In the experimental example 3, the frequency difference is segmentally changed between 8 Hz and 12 Hz automatically and cyclically, a change amount of each change in the frequency difference is 0.1 Hz, and the same frequency difference is remained unchanged for 4 seconds after each change. Referring to FIG. 3A, within 8 minutes of continuously inputting the frequency difference in the manner of the experimental example 3, it may be detected that the brain of the testee is induced with α waves in almost most of the time periods, but the energy of the induced α waves is very low.

Figure 3B:
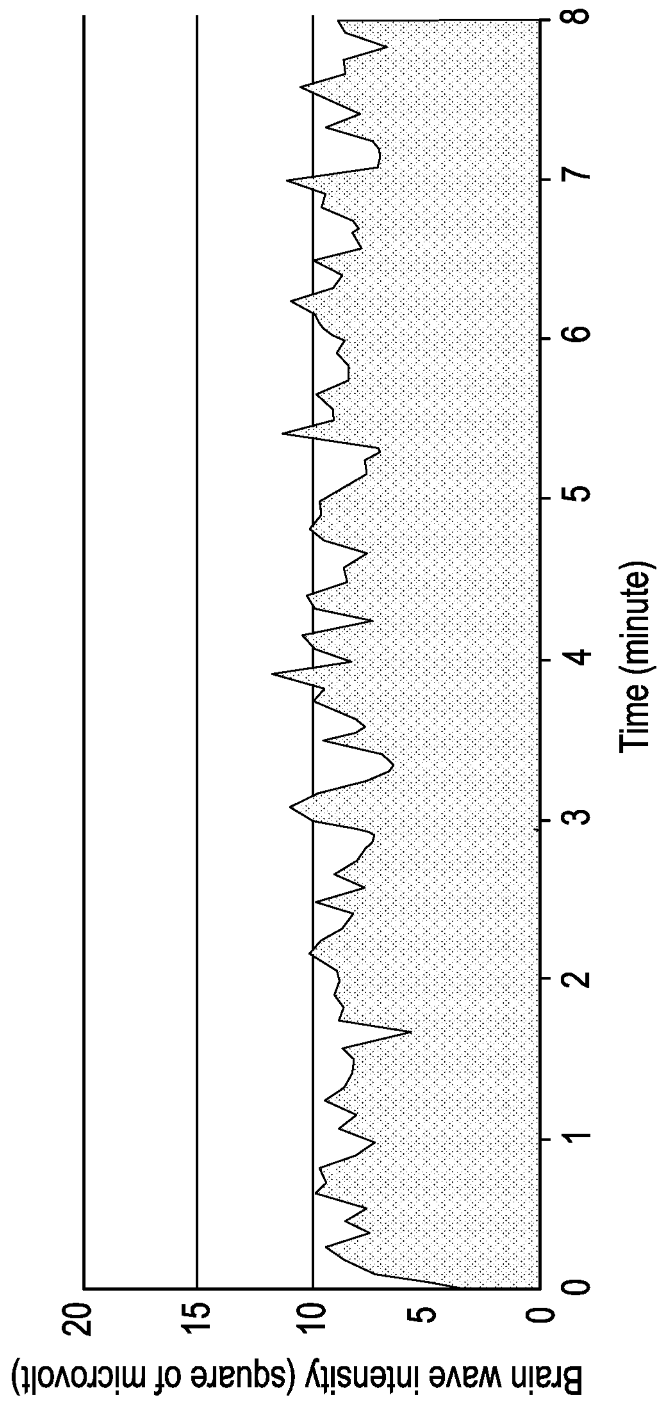
FIG. 3B is an experimental result of an experimental example 4 using a sound providing method using an earphone set of the embodiment.

FIG. 3B is an experimental result of an experimental example 4 using a sound providing method using an earphone set of the embodiment. The testees in the experimental example 3 and the experimental example 4 are the same person. In the experimental example 4, the frequency difference is segmentally changed between 8 Hz and 12 Hz automatically and cyclically, a change amount of each change in the frequency difference is 0.1 Hz, and the same frequency difference is remained unchanged for 5 seconds after each change. Referring to FIG. 3B, within 8 minutes of continuously inputting the frequency difference in the manner of the experimental example 4, it may be detected that the brain of the testee is induced with α waves in almost most of the time periods, and the energy of the induced α waves is continuously maintained at a high level.

Based on the analysis result of table 1 and by comparing the experimental result of the experimental example 3 of FIG. 3A and the experimental result of the experimental example 4 of FIG. 3B, in the sound providing method using the earphone set of the embodiment, the same frequency difference is, for example, remained unchanged for 5 seconds to 120 seconds after each change, which may achieve a better brain wave induction efficiency, but the disclosure is not limited thereto.

In the embodiment, the frequency difference may be automatically and cyclically changed between 0.5 Hz to 4 Hz to induce δ waves, the frequency difference may be automatically and cyclically changed between 4 Hz to 8 Hz to induce θ waves, the frequency difference may be automatically and cyclically changed between 8 Hz and 12 Hz to induce α waves, the frequency difference may be automatically and cyclically changed between 12 Hz and 20 Hz to induce β waves, and the frequency difference may automatically and cyclically changed between 25 Hz and 40 Hz to induce γ waves. In addition, in the embodiment, the frequency difference may also be only gradually larger or only gradually smaller if limited by a time period that is not long enough.

In a sound providing method using an earphone set of another embodiment of the disclosure, the frequency difference is gradually decreased from a larger value to a target value, for example, gradually decreased from 12 Hz to 0.5 Hz. When the frequency difference becomes smaller than the target value, the brain wave induction procedure may be ended. In the embodiment, the frequency difference may be automatically and segmentally decreased gradually, for example, the frequency difference is decreased by 0.1 Hz each time.

Figure 4A:
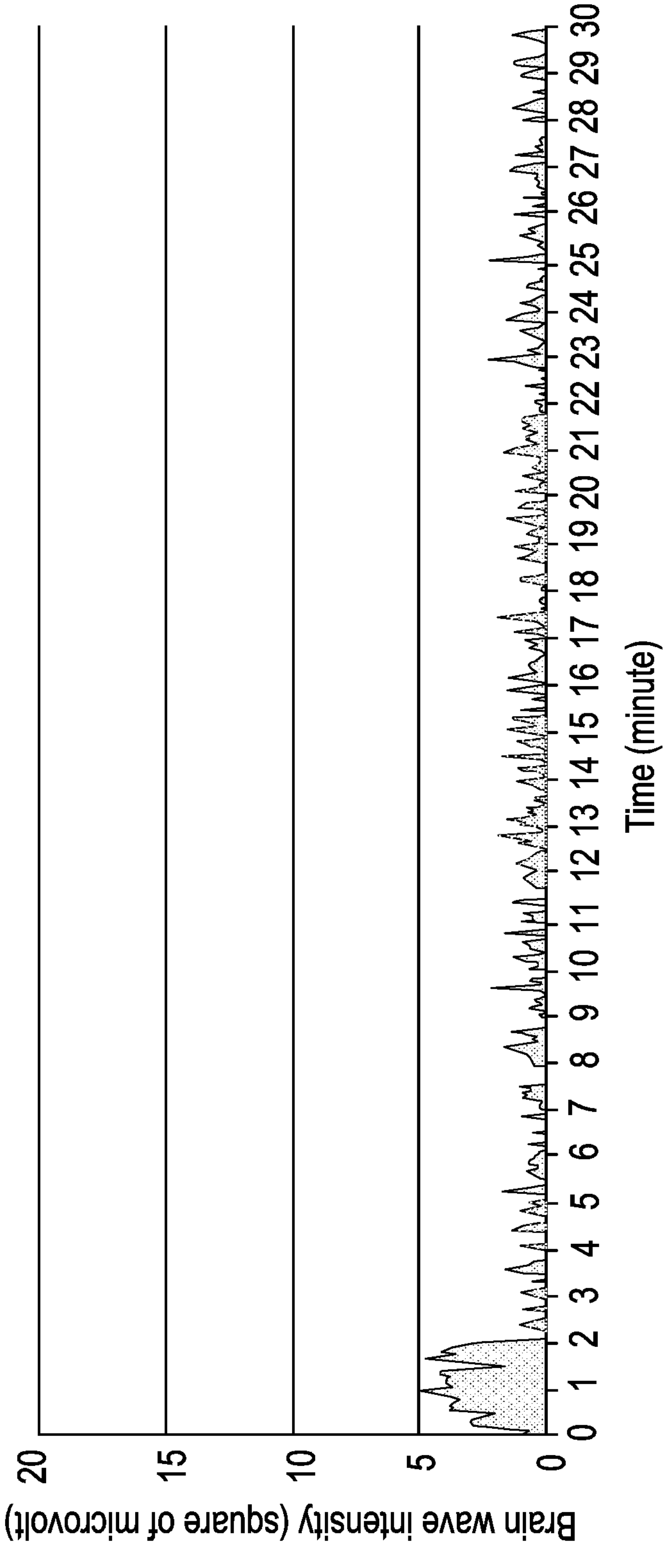
FIG. 4A is an experimental result of a comparative example 3 using a sound providing method using an earphone set of the prior art.

FIG. 4A is an experimental result of a comparative example 3 using a sound providing method using an earphone set of the prior art. In the comparative example 3, the frequency difference is kept constant at 2 Hz. Referring to FIG. 4A, within 30 minutes of continuously inputting the frequency difference, δ waves are induced in the testee's brain only in the first 2 minutes. However, after 2 minutes of the experiment, it was almost impossible to detect any δ waves being induced in the testee's brain.

Figure 4B:
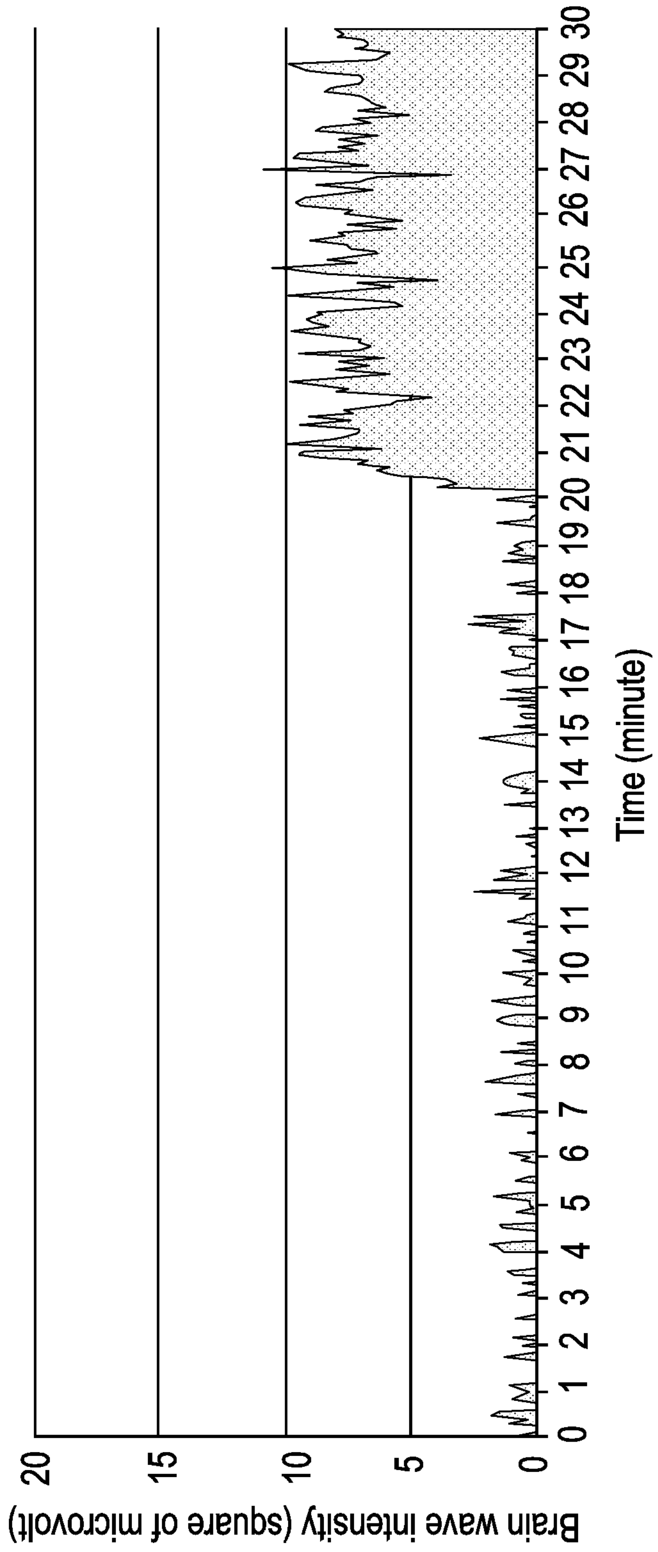
FIG. 4B is an experimental result of an experimental example 5 using a sound providing method using an earphone set of the embodiment.

Conversely, in the sound providing method using the earphone set of the embodiment, the frequency difference between the first frequency and the second frequency is automatically gradually decreased along with time. FIG. 4B is an experimental result of an experimental example 5 using a sound providing method using an earphone set of the embodiment. The testees in the comparative example 3 and experimental example 5 are the same person. In the experimental example 5, the frequency difference is automatically and segmentally decreased from 12 Hz to 0.5 Hz gradually, a change amount of each change in the frequency difference is 0.1 Hz. and the same frequency difference is remained unchanged for 16 seconds after each change. Referring to FIG. 4B, during the first 20 minutes of continuously inputting the frequency difference in the manner of the experimental example 5, since the difference between the frequency difference and the δ wave is relatively large, it was almost impossible to detect any δ waves being induced in the testee's brain. However, after 20 minutes of the experiment, δ waves could be detected in the testee's brains most of the time, and the energy of the detected induced δ waves is particularly high. This is because that the sound providing method using the earphone set of the embodiment induces the testees with automatically gradually decreased frequency differences, so that better induction effects may be produced at multiple frequency differences, and good brain wave induction effects are produced in a longer period of time.

Comparing the experimental result of the comparative example 3 in FIG. 4A and the experimental result of the experimental example 5 in FIG. 4B, it may be clearly seen that the sound providing method using the earphone set of the embodiment is more efficient in inducing brain waves than the prior art. Namely, in the sound providing method using the earphone set of the embodiment, the automatic gradual decrease of the frequency difference along with time may obviously and effectively induce brain waves.

Figure 5A:
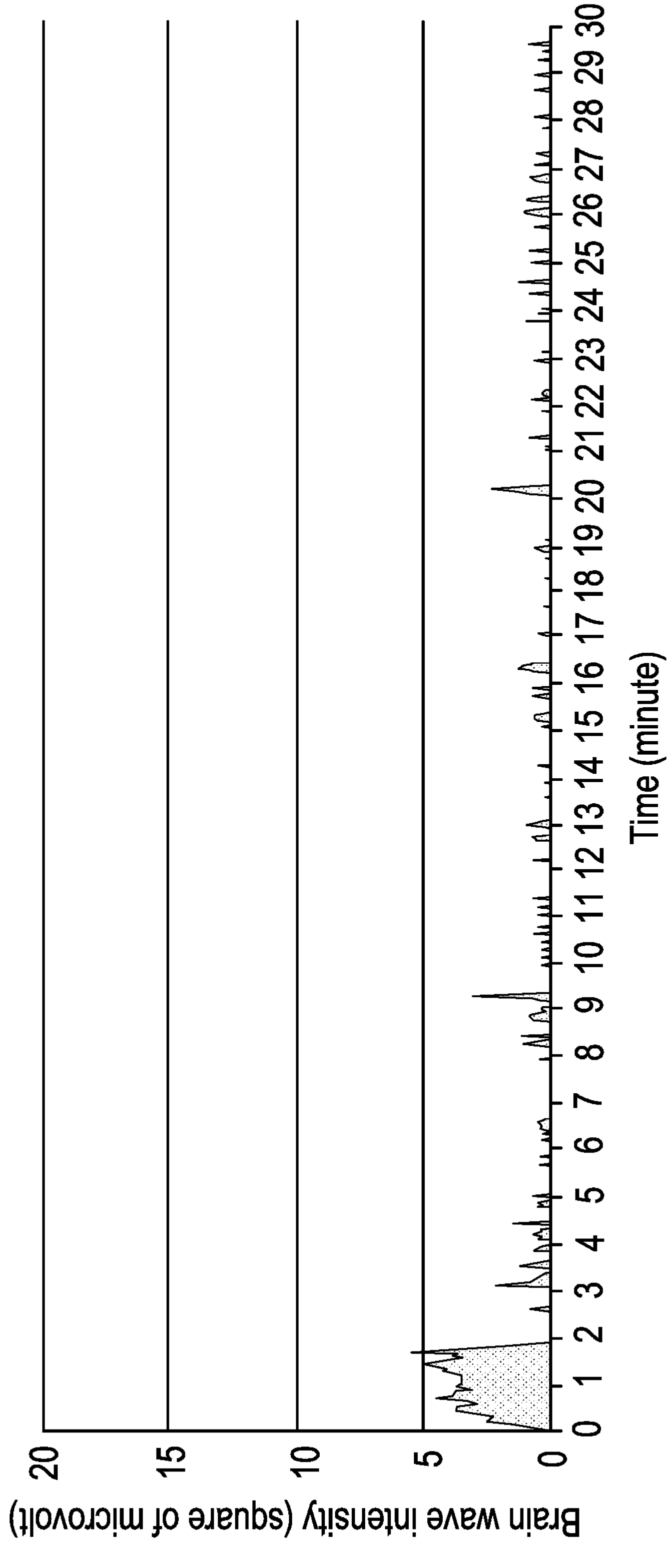
FIG. 5A is an experimental result of a comparative example 4 using a sound providing method using an earphone set of the prior art.

FIG. 5A is an experimental result of a comparative example 4 using a sound providing method using an earphone set of the prior art. In the comparative example 4, the frequency difference was kept constant at 2 Hz, but the testee is different from that of the comparative example 3. Referring to FIG. 5A, similar to the comparative example 3, within 30 minutes of continuously inputting such frequency difference, δ waves are induced in the brain of the testee only in the first 2 minutes. However, after 2 minutes of the experiment, it was almost impossible to detect any δ waves being induced in the testee's brain.

Figure 5B:
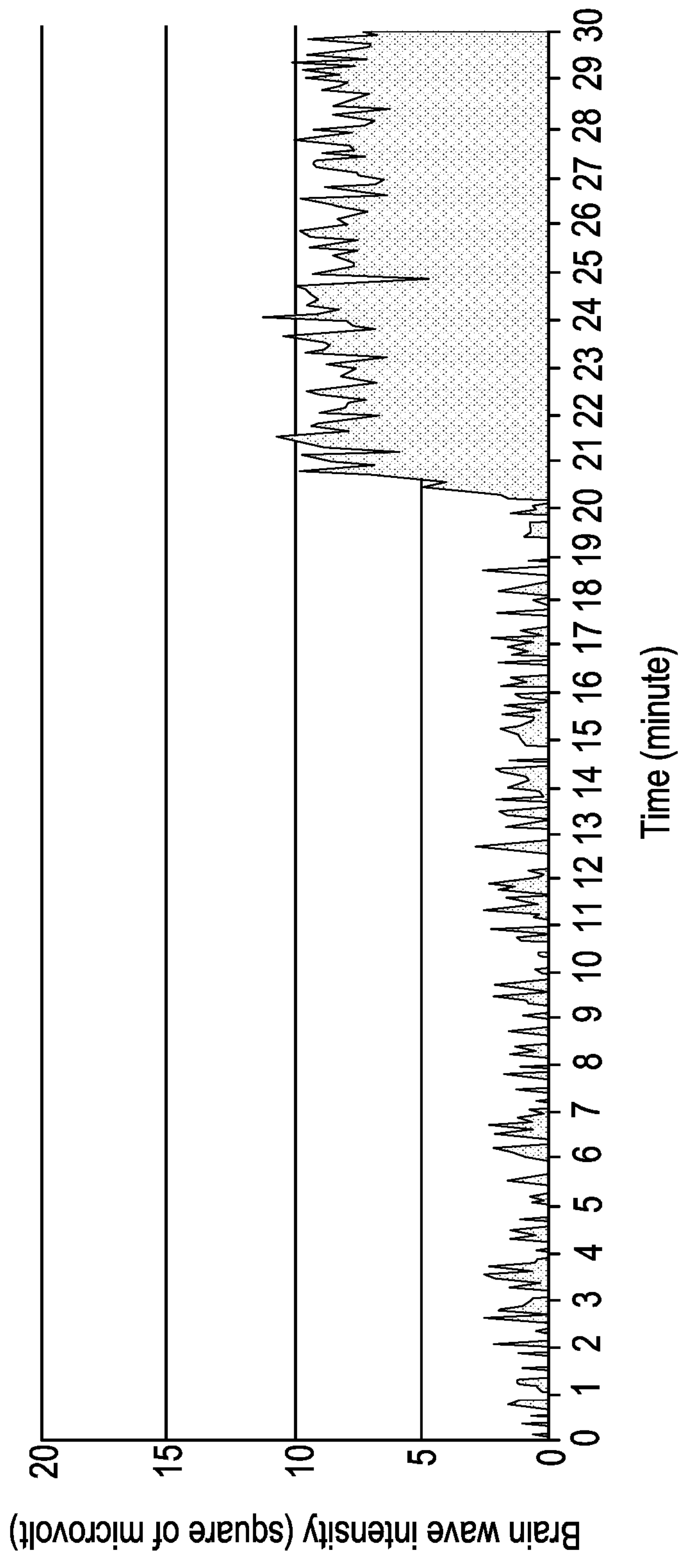
FIG. 5B is an experimental result of an experimental example 6 using a sound providing method using an earphone set of the embodiment.

FIG. 5B is an experimental result of an experimental example 6 using a sound providing method using an earphone set of the embodiment. The testees in the comparative example 4 and experimental example 6 are the same person. In the experimental example 6, the frequency difference is automatically and segmentally decreased from 12 Hz to 0.5 Hz gradually, a change amount of each change in the frequency difference is 0.1 Hz, and the same frequency difference is remained unchanged for 16 seconds after each change. Referring to FIG. 5B, similar to the experimental example 5, during the first 20 minutes of continuously inputting the frequency difference in the manner of the experimental example 6, since the difference between the frequency difference and the δ wave is relatively large, it is almost impossible for the δ wave to be induced in the testee's brain. However, after 20 minutes of the experiment, δ waves could be detected in the testee's brains most of the time, and the energy of the detected induced δ waves is particularly high.

Comparing the experimental result of the comparative example 4 in FIG. 5A and the experimental result of the experimental example 6 in FIG. 5B, it may be proved again that the sound providing method using the earphone set of the embodiment is more efficient in inducing brain waves than the prior art. Namely, in the sound providing method using the earphone set of the embodiment, the automatic and cyclic change of the frequency difference along with time within a preset range may obviously and effectively induce brain waves.

Figure 6A:
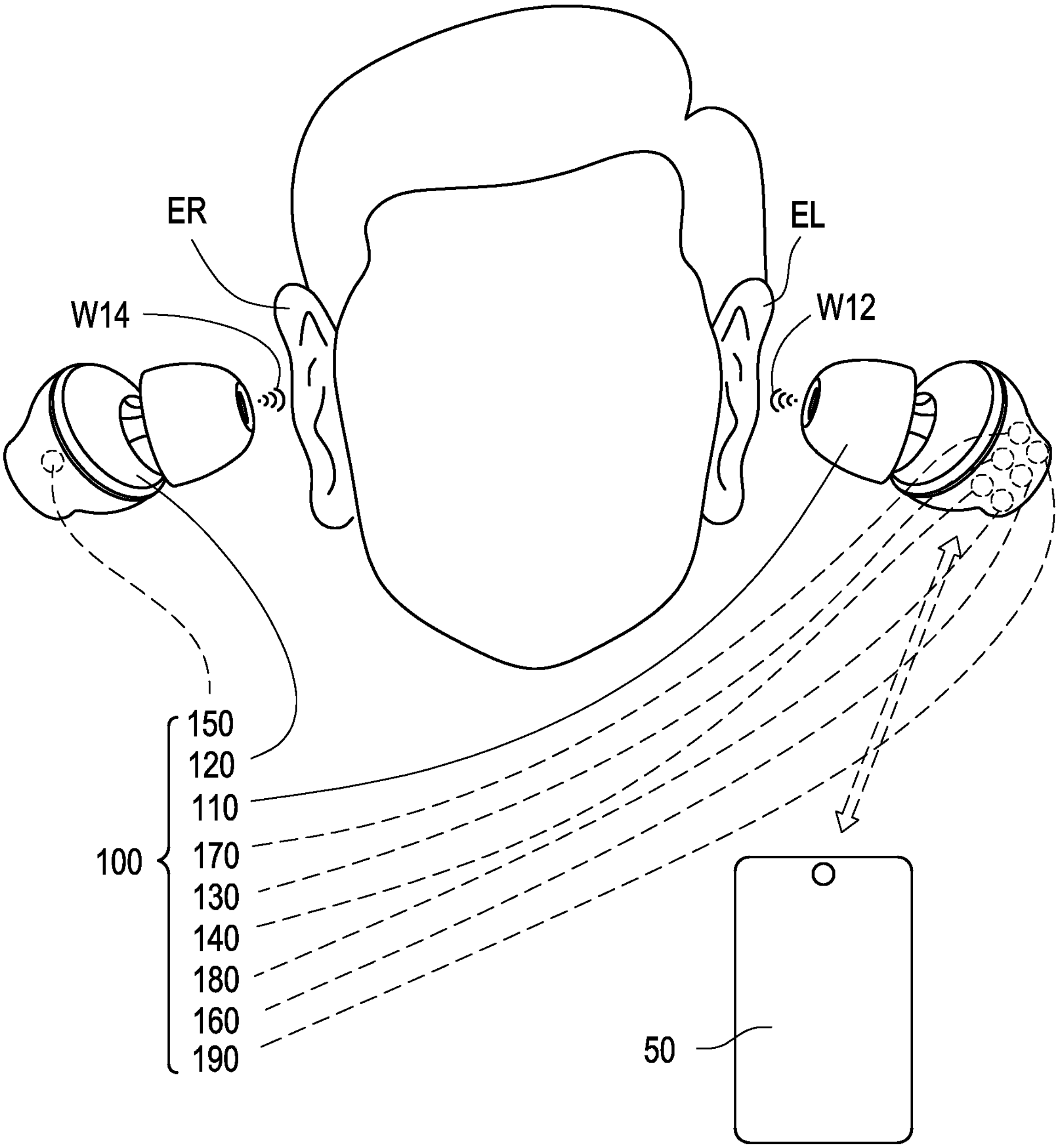
FIG. 6A is a schematic view of an earphone set in an operation state according to one embodiment of the disclosure.
Figure 6B:
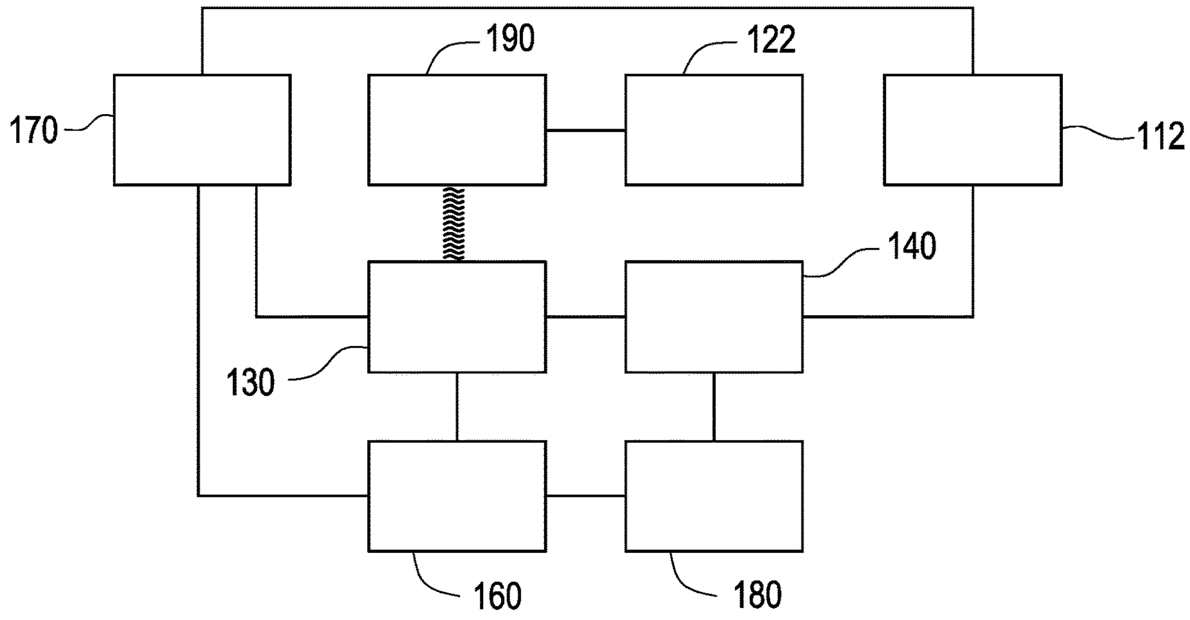
FIG. 6B is a circuit block schematic view of the earphone set in FIG. 6A.

FIG. 6A is a schematic view of an earphone set in an operation state according to one embodiment of the disclosure. FIG. 6B is a circuit block schematic view of the earphone set in FIG. 6A. Referring to FIG. 6A and FIG. 6B, the earphone set 100 of the embodiment includes a left ear earphone 110, a right ear earphone 120, a first wireless communicator 130, and a frequency adjuster 140. A speaker 112 of the left ear earphone 110 is configured to provide a first sound wave W12 to a left ear EL of a user. A speaker 122 of the right ear earphone 120 is configured to provide a second sound wave W14 to a right ear EL of the user. The frequency adjuster 140 is electrically connected to the speaker 112 of the left ear earphone 110, the speaker 122 of the right ear earphone 120, and the first wireless communicator 130. The first wireless communicator 130 is configured to receive and transmit an external audio to the frequency adjuster 140. The frequency adjuster 140 adjusts the external audio to a first audio and transmits to the speaker 112 of the left ear earphone 110 so that the first sound wave W12 is emitted. The frequency adjuster 140 adjusts the external audio to a second audio and transmits to the speaker 122 of the right ear earphone 120 so that the second sound wave is emitted. There is a frequency difference between a first frequency of the first sound wave W12 and a second frequency of the second sound wave W14. The frequency adjuster 140 causes the frequency difference to automatically and cyclically change along with time.

The frequency adjuster 140 causes the frequency difference to automatically and cyclically change along with time, which means that this frequency difference is not constant.

Moreover, without human intervention, this frequency difference is automatically changed according to a preset method. In addition, the way this frequency difference changes is preset and is unable to be adjusted or selected by the user. Alternatively, there may be multiple ways to change and the user may choose which one to use. In addition, the user's physiological state is not detected before determining how the frequency difference changes, that is, the frequency difference does not change according to the difference in the user's physiological state.

In the earphone set 100 of the embodiment, the frequency adjuster 140 causes the first sound wave W12 and the second sound wave W14 provided to the user's left ear EL and right ear EL to have a frequency difference and allows the frequency difference to allow the user to receive corresponding binaural beats, and the human brain receiving the binaural beats may be induced to have brain waves at the corresponding frequency. At the same time, this frequency difference changes automatically and cyclically along with time, which may obviously and effectively induce required brain waves.

For example, when the user wears the earphone set 100 of the embodiment and listens to the voice message transmitted by others, for example, during a group tour, when the user wears the earphone set 100 of the embodiment and listens to the tour introduction transmitted by the tour guide, the frequency adjuster 140 may cause the frequency difference between the first sound wave W12 and the second sound wave W14 to change between 12 and 20 Hz, which allows the user to receive the corresponding binaural beats, and the brain receiving the binaural beats may be stimulated to produce β waves, so that the user may listen to the tour guide in a focused state.

Alternatively, when the tour group is moving over a long distance and the user continues to wear the earphone set 100 of the disclosure, the frequency adjuster 140 may also cause the frequency difference between the first sound wave W12 and the second sound wave W14 to change between 8 and 14 Hz, which allows the user to receive the corresponding binaural beats, and the brain receiving the binaural beats may be stimulated to produce α waves and generate a sense of relaxation, which is favorable for recovering the physical strength to meet the next trip.

Alternatively, when the tour group is moving over a long distance or resting in a hotel at night and the user continues to wear the earphone set 100 of the embodiment, the frequency adjuster 140 may also cause the frequency difference between the first sound wave W12 and the second sound wave W14 to change between 0.5 and 4 Hz, which allows the user to receive the corresponding binaural beats, and the brain receiving the binaural beats may be stimulated to produce δ waves, so that the user may fall asleep quickly and have a good sleeping quality.

Alternatively, when the user wants to eliminate distractions and enter a meditative state and the user wears the earphone set 100 of the embodiment, the frequency adjuster 140 may also cause the frequency difference between the first sound wave W12 and the second sound wave W14 to change between 4 and 8 Hz, which allows the user to receive the corresponding binaural beats, and the brain receiving the binaural beats may be stimulated to produce θ waves, so that the user may enter a meditative state very quickly.

In the embodiment, the earphone set 100 further includes a second wireless communicator 150. The first wireless communicator 130 is provided in the left ear earphone 110, that is, the first wireless communicator 130 is provided in the casing of the left ear earphone 110. The second wireless communicator 150 is provided in the right ear earphone 120, that is, the second wireless communicator 150 is provided in the casing of the right ear earphone 120. The frequency adjuster 140 transmits the second audio to the second wireless communicator 150 through the first wireless communicator 130. The second wireless communicator 150 transmits the second audio to the speaker 122 of the right ear earphone 120 so that the second sound wave W14 is emitted. Thus, the left ear earphone 110 and the right ear earphone 120 do not need to be connected using a physical circuit to transmit signals, which may avoid interference to the user from the physical circuit.

However, in other embodiments, the left ear earphone 110 and the right ear earphone 120 may also be connected using a neck frame, connection wire, or other methods, which may reduce the trouble of storing the left ear earphone 110 and the right ear earphone 120 respectively. At this time, the first wireless communicator 130 may directly transmit the second audio to the right ear earphone 120, or the second wireless communicator 150 may transmit the second audio to the right ear earphone 120.

In the embodiment, the earphone set 100 may further include a pick-up 160, which is electrically connected to the first wireless communicator 130 and is configured to transmit a third audio obtained by pickup to the first wireless communicator 130. The first wireless communicator 130 transmits the third audio to an outside. For example, the pick-up 160 is formed by a microphone and an analog-to-digital converter, but the disclosure is not limited thereto. With the pick-up 160, the earphone set 100 has the function of making calls, and the user may send messages to other devices.

In the embodiment, the earphone set 100 may further include an active noise cancellation circuit 180, which is electrically connected to the pick-up 160 and the frequency adjuster 140 and is configured to invert the ambient sound obtained by pickup and then transmit to the frequency adjuster 140 to join the first audio and the second audio. Namely, after the pick-up 160 receives the ambient sound, the inverted ambient sound may be added to the first audio and the second audio, so that the first sound wave W12 and second sound wave W14 heard by the user appear to contain no ambient sound, achieving an active anti-noise effect. In this way, the effect of frequency difference on stimulating brain waves may also be improved.

In the embodiment, the first wireless communicator 130, for example, complies with the low-power Bluetooth communication specification and has low power consumption and environmentally friendly effects. In the embodiment, the first wireless communicator 130 may also transmit location information, which may facilitate the tour guide to know the whereabouts of the group members during group travel, and may also have other more related applications.

In the embodiment, the earphone set 100 may further include a language conversion circuit 170 configured to receive and identify a first language included in the third audio, convert the first language to a second language, and transmit a fourth audio including the second language to the speaker 112 of the left ear earphone 110 and the speaker 122 the right ear earphone 120. In other words, the earphone set 100 may have the function of language translation. When the user is traveling abroad or in a non-native environment, the earphone set 100 may convert the third audio picked up by the pick-up 160 into the language specified by the user and play it to the user.

In the embodiment, the first wireless communicator 130 may perform wireless communication with a cell phone 50. The cell phone 50 may execute a voice communication application, such as WeChat, LINE or other communication applications, and transmit external audio to the first wireless communicator 130. When the user uses the voice communication application to make a two-way call through the earphone set 100 and the cell phone 50, the frequency difference generated by the frequency adjuster 140 may cause the user's brain to excite corresponding brain waves to produce concentration or other effects.

In the embodiment, the first wireless communicator 130 may perform wireless communication with a cell phone 50. The cell phone 50 executes a differential frequency control application to control the frequency difference through the frequency adjuster 140. For example, during a group tour, the tour guide may execute the differential frequency control application on his/her cell phone, which may control the frequency difference of not only the tour guide's own earphone set 100, but also the frequency difference of multiple slave earphone sets. Namely, the tour guide may control the slave earphone sets worn by the group members through the differential frequency control application on his/her cell phone, so that the tour guide may adjust according to the itinerary needs.

For ordinary users, they may also control the frequency adjuster 140 through the differential frequency control application on the cell phone 50, so as to determine the type of brain wave to be stimulated and to obtain the desired corresponding effect.

In the embodiment, the earphone set 100 may further include an audio source 190 configured to transmit an internal audio to the frequency adjuster 140. The frequency adjuster 140 adjusts the internal audio to a third audio and transmits to the speaker 112 of the left ear earphone 110 so that the third sound wave is emitted. The frequency adjuster 140 adjusts the internal audio to a fourth audio and transmits to the speaker 122 of the right ear earphone 120 so that the fourth sound wave is emitted. The third frequency of the third sound wave and the fourth frequency of the fourth sound wave have the same frequency difference as mentioned above, that is, the same frequency difference as the first sound wave W12 and the second sound wave W14.

Since the tour guide's narration is not continuous, in order to allow the user to continuously receive the frequency difference and induce brain waves, the third sound wave may be provided to the left ear EL of the user, and the fourth sound wave may be provided to the right ear EL of the user while providing the first sound wave and the second sound wave, or during a blank period therebetween. Since such a background sound wave is continuous without a blank part, brain waves may continue to be induced when the tour guide stops the narration. The background sound wave is, for example, sound waves such as wind and sea waves. In the embodiment, the aforementioned internal audio may be pre-stored in the audio source 190, or the audio source 190 may calculate to generate the aforementioned internal audio. The calculation process of the audio source 190 may apply artificial intelligence to reduce the repetitive feeling of background sound waves.

Figure 7:
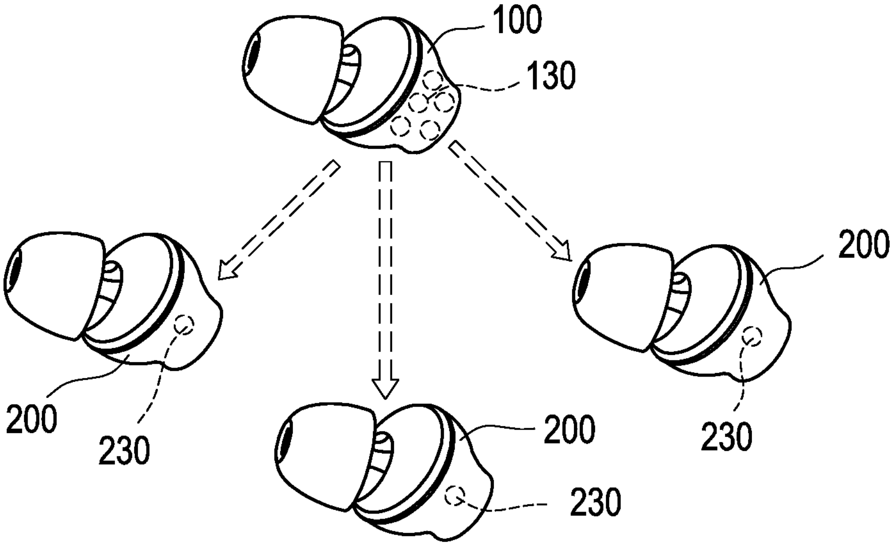
FIG. 7 is a schematic view of the earphone set in FIG. 6A in an operation state when communicating with other devices.

FIG. 7 is a schematic view of the earphone set in FIG. 6A in an operation state when communicating with other devices, and only the left ear earphone 110 and some of the components of the earphone set 100 in FIG. 6A are drawn. Referring to FIG. 7, in the embodiment, the first wireless communicator 130 performs Bluetooth broadcast. That is, the first wireless communicator 130 serves as a broadcast host to transmit audio to other earphone sets 200, and the wireless communicator 230 of each of the earphone sets 200 receives the broadcast. For example, during a group tour, the tour guide may wear the earphone set 100 of the embodiment and speak to give tour narrations, and the group members may wear the earphone sets 200 to listen to the tour narrations and may also move around and visit freely without distance restrictions.

Figure 8:
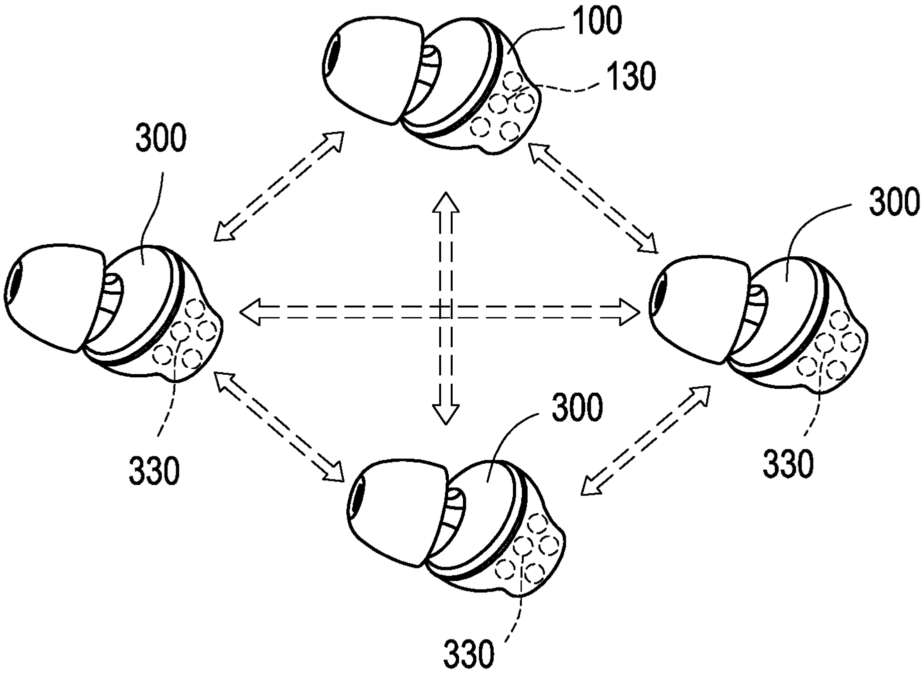
FIG. 8 is a schematic view of the earphone set in FIG. 6A in another operation state when communicating with other devices.

FIG. 8 is a schematic view of the earphone set in FIG. 6A in another operation state when communicating with other devices, only the left ear earphone 110 and some of the components of the earphone set 100 in FIG. 6A are drawn. Referring to FIG. 8, in the embodiment, the first wireless communicator 130 serves as a node of a many-to-many Bluetooth mesh. Namely, the wireless communicator 330 may be used for two-way communication between the first wireless communicator 130 and each of the earphone sets 300. For example, during a group tour, the tour guide may wear the earphone set 100 of the embodiment and speak to give guidance instructions, in addition to wearing the earphone sets 300 to listen to the tour guide, group members may also ask questions at any time, which is more conducive to instant contact. For another example, when giving a course lecture in a large conference room, the lecturer may wear the earphone set 100 of the embodiment and deliver a speech, participants in the lecture may wear the earphone sets 300 to listen to the content, and may also ask questions at any time without passing the microphone.

Figure 9:
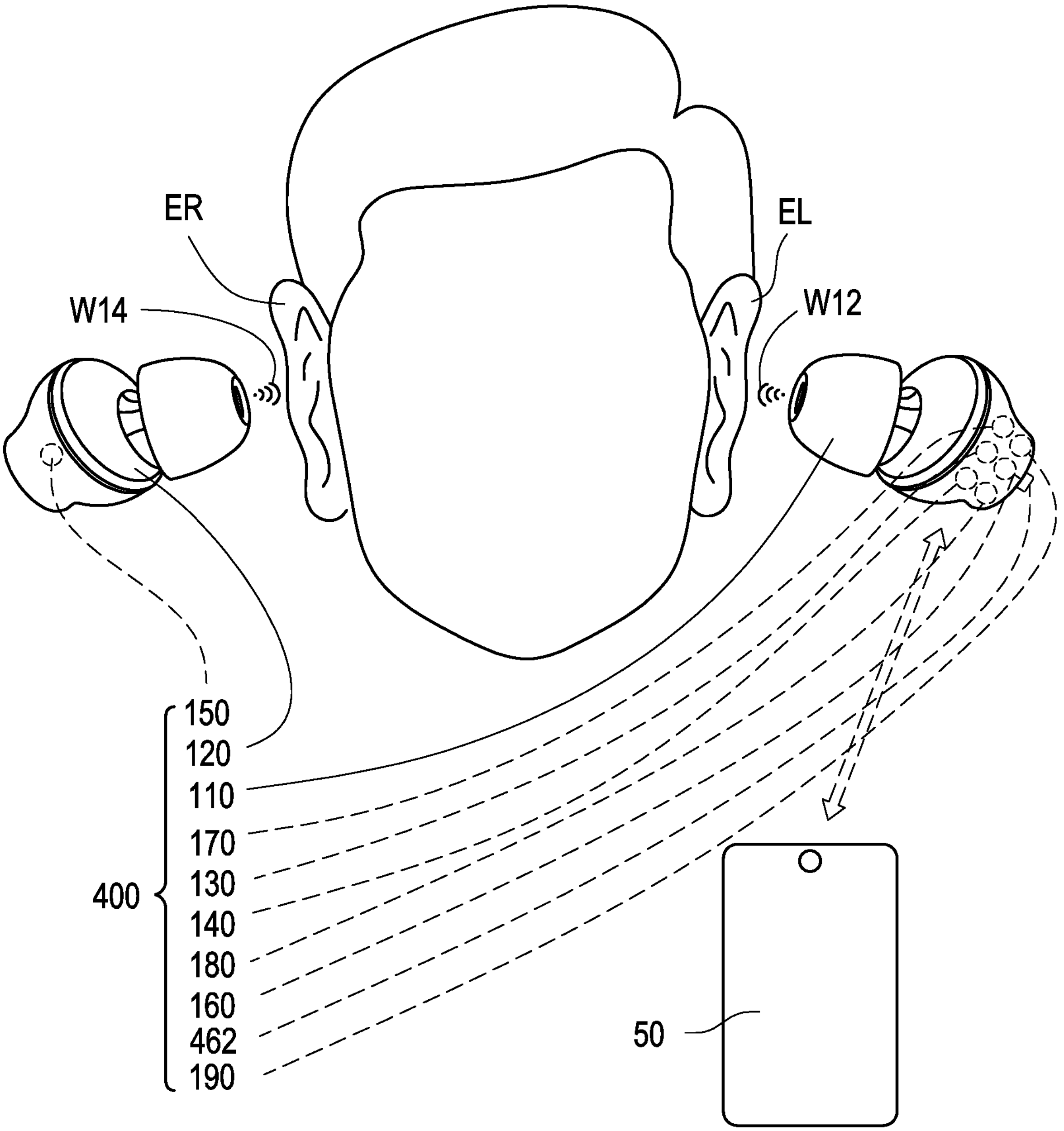
FIG. 9 is a schematic view of an earphone set in an operation state according to another embodiment of the disclosure.

FIG. 9 is a schematic view of an earphone set in an operation state according to another embodiment of the disclosure. Referring to FIG. 9, the earphone set 400 of the embodiment is substantially the same as the earphone set 100 in FIG. 6A, and the differences between the two are mainly described here. The earphone set 400 of the embodiment also includes the pick-up 160, so it has the function of making calls, and the user may transmit audio to other devices. For example, during a group tour, the earphone set 400 may receive the tour guide's narrations, and when the group members have questions or other needs, a speech may be transmitted to the tour guide through the pick-up 160 and the first wireless communicator 130, or even to other group members at the same time. In the embodiment, the earphone set 400 further includes a pick-up switch 462, which is electrically connected to the pick-up 160 and configured to enable or disable the pick-up 160. Namely, the user may use the pick-up switch 462 to enable the pick-up 160 when the user wants to speak, or the user may use the pick-up switch 462 to disable the pick-up 160 when the user does not need to speak, so as to avoid disturbing the tour guide. The pick-up switch 462 is, for example, a mechanical switch, a touch switch, or may switch the switch state by a signal.

Figure 10:
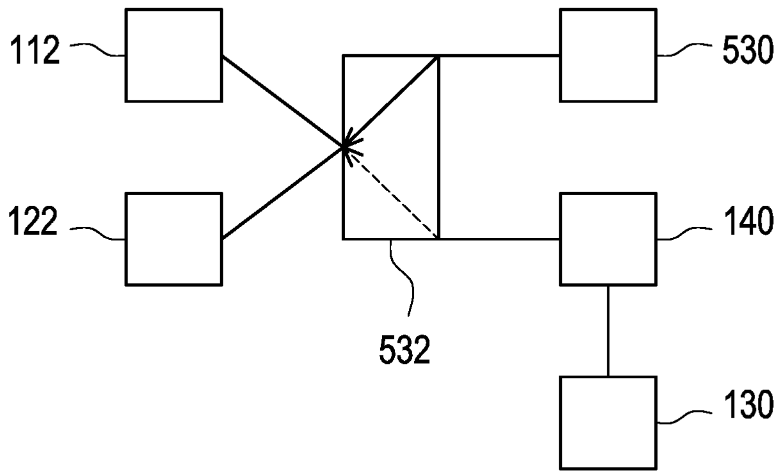
FIG. 10 is a circuit block schematic view of main components of an earphone set according to yet another embodiment of the disclosure.

FIG. 10 is a circuit block schematic view of main components of an earphone set according to yet another embodiment of the disclosure. Referring to FIG. 10, the earphone set of the embodiment is similar to the earphone set 100 in FIG. 6A, and the differences between the two are mainly described here. The earphone set of the embodiment further includes a wireless communicator 530 and a wireless communication switch 532. The wireless communicator 530 is configured to receive the external audio. The wireless communication switch 532 is configured to control the speaker 112 of the first earphone and the speaker 122 of the second earphone to connect to the first wireless communicator 130 or the wireless communicator 530 by signal. Namely, in the first state, the speaker 112 of the first earphone and the speaker 122 of the second earphone are connected to the first wireless communicator 130 via the frequency adjuster 140 by signal. In the second state, the speaker 112 of the first earphone and the speaker 122 of the second earphone are connected to the wireless communicator 530 by signal. In the embodiment, the frequency adjuster 140 causes the frequency difference to automatically change along with time, but it is not limited to automatically change along with time.

For example, the first wireless communicator 130 and the wireless communicator 530 are respectively suitable for different situations. For example, in the tour mode, the wireless communicator 530 may be used to receive tour narrations from the tour guide. Different from the embodiment of FIG. 6A, the frequency adjuster 140 is not used in the tour mode. After finishing the tour mode, the earphone set may be switched to use the first wireless communicator 130 to perform wireless communication with the user's own cell phone, that is, at this time, the earphone set may be used as a normal earphone for the user to listen to music played on the cell phone, talk to other people via the cell phone, or for other purposes. At the same time, the frequency adjuster 140 may also be used to stimulate the user's brain to produce different brain waves to produce relaxation, concentration or other effects. The wireless communication switch 532 is, for example, a mechanical switch, a touch switch, or may switch the switch state by a signal. In the embodiment, the first wireless communicator 130, for example, performs Bluetooth communication, and the wireless communicator 530, for example, performs frequency modulation communication.

Figure 11:
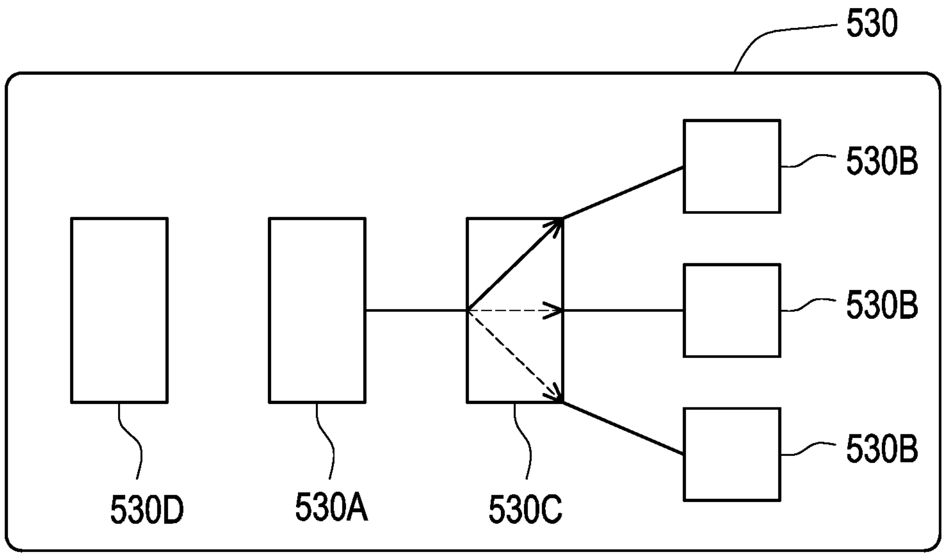
FIG. 11 is a circuit block schematic view of the wireless communicator of the earphone set in FIG. 10.

FIG. 11 is a circuit block schematic view of the wireless communicator of the earphone set in FIG. 10. Referring to FIG. 11, the wireless communicator 530 of the embodiment includes a receiver 530A, multiple antennas 530B, and a frequency band switcher 530C. The antennas 530B are configured to receive signals of different frequency bands. The frequency band switcher 530C is configured to control the receiver 530A to electrically connect to one of the antennas 530B. The wireless communicator 530 of the embodiment is, for example, configured to receive frequency modulation (FM) signals. Since the frequency bands of FM signals allowed in different regions may vary, the user may need to use the frequency band switcher 530C to switch the antenna 530B used when the user arrives at a different region to ensure that the antenna 530B used is capable of receiving the local frequency modulation (FM) signals. In addition, the wireless communicator 530 of the embodiment may further include a transmitter 530D, which may wirelessly transmit the signal input to the wireless communicator 530 to the outside. In addition, the multi-antenna and switchable architecture of the wireless communicator 530 of the embodiment may also be applied to the first wireless communicator 130 of the embodiment in FIG. 6A.

In summary, in the sound providing method using the earphone set of the disclosure, since the frequency difference is changed automatically and cyclically along with time, even if different users have different brain wave induction effects after receiving different frequency differences, most of them may be induced with target brain waves by their more sensitive frequency differences by changing the frequency difference. Moreover, the frequency difference that each user is more sensitive to may not be a single specific value but multiple specific values, and since the sound providing method using the earphone set of the disclosure uses the frequency difference that changes automatically and cyclically along with time, it may correspond to the correct frequency difference one by one to induce the target brain wave, and increase the time for successful brain wave induction. In the earphone set of the disclosure, in addition to listening to the sound content, the frequency difference controlled by the frequency adjuster allows the user to receive automatically cyclically changing binaural beats, this allows the user's brain to stimulate and produce specific brain waves to achieve effects such as improving concentration, sleeping, relieving stress, and entering meditation.

What is claimed is:

1. A sound providing method using an earphone set, comprising:

simultaneously providing a first sound wave to a left ear of a user by using a left ear earphone of an earphone set and a second sound wave to a right ear of the user by using a right ear earphone of the earphone set, wherein there is a frequency difference between a first frequency of the first sound wave and a second frequency of the second sound wave, the frequency difference automatically and cyclically changes along with time, and the frequency difference is remained unchanged for 5 seconds to 120 seconds after each change.

2. The sound providing method using the earphone set according to claim 1, wherein the frequency difference is changed multi-segmentally along with time.

3. The sound providing method using the earphone set according to claim 1, wherein the frequency difference is changed automatically and cyclically between 0.5 Hz and 4 Hz, automatically and cyclically between 4 Hz and 8 Hz, automatically and cyclically between 8 Hz and 12 Hz, automatically and cyclically between 12 Hz and 20 Hz, or automatically and cyclically between 25 Hz and 40 Hz.

4. The sound providing method using the earphone set according to claim 1, wherein after respectively providing the first sound wave and the second sound wave to the left ear and the right ear of the user for a predetermined time, provision of the first sound wave and the second sound wave is automatically stopped.

5. The sound providing method using the earphone set according to claim 1, wherein the first sound wave and the second sound wave are respectively generated after performing a frequency adjustment on a self-selected audio of the user by a frequency adjuster of the earphone set.

6. A sound providing method using an earphone set, comprising:

simultaneously providing a first sound wave to a left ear of a user by using a left ear earphone of an earphone set and a second sound wave to a right ear of the user by using a right ear earphone of the earphone set, wherein there is a frequency difference between a first frequency of the first sound wave and a second frequency of the second sound wave, and the frequency difference automatically and cyclically changes along with time; and providing a first background sound wave to the left ear of the user by using the left ear earphone and a second background sound wave to the right ear of the user by using the right ear earphone while providing the first sound wave and the second sound wave, wherein the frequency difference is provided between a third frequency of the first background sound wave and a fourth frequency of the second background sound wave.

7. An earphone set, comprising:

a left ear earphone, configured to provide a first sound wave to a left ear of a user;

a right ear earphone, configured to provide a second sound wave to a right ear of the user;

a first wireless communicator;

a frequency adjuster, electrically connected to the left ear earphone, the right ear earphone, and the first wireless communicator, wherein the first wireless communicator is configured to receive and transmit an external audio to the frequency adjuster, the frequency adjuster adjusts the external audio to a first audio and transmits to the left ear earphone so that the first sound wave is emitted, the frequency adjuster adjusts the external audio to a second audio and transmits to the right ear earphone so that the second sound wave is emitted, there is a frequency difference between a first frequency of the first sound wave and a second frequency of the second sound wave, and the frequency difference automatically and cyclically changes along with time; and a pick-up and a pick-up switch, wherein the pick-up is electrically connected to the first wireless communicator and is configured to transmit a third audio obtained by pickup to the first wireless communicator, the first wireless communicator transmits the third audio to an outside, and the pick-up switch is electrically connected to the pick-up and configured to enable or disable the pick-up.

8. The earphone set according to claim 7, wherein the first wireless communicator performs wireless communication with a cell phone, and the cell phone transmits the external audio.

9. The earphone set according to claim 7, wherein the first wireless communicator performs wireless communication with a cell phone, and the cell phone executes a voice communication application.

10. The earphone set according to claim 7, further comprising: a language conversion circuit, configured to receive and identify a first language included in the third audio, convert the first language to a second language, and transmit a fourth audio including the second language to the left ear earphone and the right ear earphone.

11. The earphone set according to claim 7, wherein the first wireless communicator serves as a node of a many-to-many Bluetooth mesh or performs Bluetooth broadcast.

12. The earphone set according to claim 7, further comprising: a second wireless communicator and a wireless communication switch, wherein the second wireless communicator is configured to receive the external audio, and the wireless communication switch is configured to switch between the left ear earphone and the right ear earphone to connect to the first wireless communicator or the second wireless communicator by signal.

13. The earphone set according to claim 12, wherein the second wireless communicator performs frequency modulation communication, and the first wireless communicator performs Bluetooth communication.

14. The earphone set according to claim 12, wherein the second wireless communicator comprises a receiver, a plurality of antennas, and a frequency band switcher, the antennas are configured to receive signals of different frequency bands, and the frequency band switcher is configured to control the receiver to electrically connect to one of the antennas.

15. The earphone set according to claim 7, wherein the first wireless communicator performs wireless communication with a cell phone, and the cell phone executes a differential frequency control application to control the frequency difference through the frequency adjuster.

16. The earphone set according to claim 15, wherein the differential frequency control application further controls a frequency difference of a plurality of slave earphone sets.

17. The earphone set according to claim 7, further comprising: an audio source, configured to transmit an internal audio to the frequency adjuster, wherein the frequency adjuster adjusts the internal audio to a third audio and transmits to the left ear earphone so that a third sound wave is emitted, the frequency adjuster adjusts the internal audio to a fourth audio and transmits to the right ear earphone so that a fourth sound wave is emitted, and there is a frequency difference between a third frequency of the third sound wave and a fourth frequency of the fourth sound wave.

18. An earphone set, comprising:

a left ear earphone, configured to provide a first sound wave to a left ear of a user;

a right ear earphone, configured to provide a second sound wave to a right ear of the user;

a first wireless communicator;

a frequency adjuster, electrically connected to the left ear earphone, the right ear earphone, and the first wireless communicator, wherein the first wireless communicator is configured to receive and transmit an external audio to the frequency adjuster, the frequency adjuster adjusts the external audio to a first audio and transmits to the left ear earphone so that the first sound wave is emitted, the frequency adjuster adjusts the external audio to a second audio and transmits to the right ear earphone so that the second sound wave is emitted, there is a frequency difference between a first frequency of the first sound wave and a second frequency of the second sound wave, and the frequency difference automatically changes along with time;

a second wireless communicator, configured to receive the external audio; and a wireless communication switch, configured to switch between the left ear earphone and the right ear earphone to connect to the first wireless communicator or the second wireless communicator by signal.

19. The earphone set according to claim 18, wherein the first wireless communicator performs wireless communication with a cell phone, and the cell phone transmits the external audio.

20. The earphone set according to claim 18, wherein the first wireless communicator performs wireless communication with a cell phone, and the cell phone executes a voice communication application.

21. The earphone set according to claim 18, further comprising: a pick-up and a pick-up switch, wherein the pick-up is electrically connected to the first wireless communicator and is configured to transmit a third audio obtained by pickup to the first wireless communicator, the first wireless communicator transmits the third audio to an outside, and the pick-up switch is electrically connected to the pick-up and configured to enable or disable the pick-up.

22. The earphone set according to claim 21, further comprising: a language conversion circuit, configured to receive and identify a first language included in the third audio, convert the first language to a second language, and transmit a fourth audio including the second language to the left ear earphone and the right ear earphone.

23. The earphone set according to claim 18, wherein the first wireless communicator serves as a node of a many-to-many Bluetooth mesh or performs Bluetooth broadcast.

24. The earphone set according to claim 18, wherein the second wireless communicator performs frequency modulation communication, and the first wireless communicator performs Bluetooth communication.

25. The earphone set according to claim 18, wherein the second wireless communicator comprises a receiver, a plurality of antennas, and a frequency band switcher, the antennas are configured to receive signals of different frequency bands, and the frequency band switcher is configured to control the receiver to electrically connect to one of the antennas.

26. The earphone set according to claim 18, wherein the first wireless communicator performs wireless communication with a cell phone, and the cell phone executes a differential frequency control application to control the frequency difference through the frequency adjuster.

27. The earphone set according to claim 26, wherein the differential frequency control application further controls a frequency difference of a plurality of slave earphone sets.

28. The earphone set according to claim 18, further comprising: an audio source, configured to transmit an internal audio to the frequency adjuster, wherein the frequency adjuster adjusts the internal audio to a third audio and transmits to the left ear earphone so that a third sound wave is emitted, the frequency adjuster adjusts the internal audio to a fourth audio and transmits to the right ear earphone so that a fourth sound wave is emitted, and there is a frequency difference between a third frequency of the third sound wave and a fourth frequency of the fourth sound wave.

* * * * *